United States Patent
Tanaka et al.

(10) Patent No.: US 12,179,977 B2
(45) Date of Patent: Dec. 31, 2024

(54) FILM FOR FOOD PACKAGING, STRETCH FILM FOR FOOD PACKAGING, FILM FOR AUTOMATIC PACKAGING MACHINE FOR FOOD PACKAGING, AND METHOD FOR PACKAGING FOOD

(71) Applicant: Mitsubishi Chemical Corporation, Tokyo (JP)

(72) Inventors: Kazuya Tanaka, Tokyo (JP); Yasuharu Amakasu, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 807 days.

(21) Appl. No.: 17/116,017

(22) Filed: Dec. 9, 2020

(65) Prior Publication Data

US 2021/0086969 A1    Mar. 25, 2021

Related U.S. Application Data

(63) Continuation of application No. PCT/JP2019/023570, filed on Jun. 13, 2019.

(30) Foreign Application Priority Data

Jun. 15, 2018 (JP) .................. 2018-114262
Sep. 27, 2018 (JP) .................. 2018-182222

(51) Int. Cl.
| | | |
|---|---|---|
| B65D 65/38 | (2006.01) | |
| B65B 11/00 | (2006.01) | |
| B65B 41/12 | (2006.01) | |
| B65D 65/02 | (2006.01) | |
| C08K 5/07 | (2006.01) | |
| C08K 5/103 | (2006.01) | |
| C08L 27/06 | (2006.01) | |

(52) U.S. Cl.
CPC .............. *B65D 65/38* (2013.01); *B65B 11/00* (2013.01); *B65B 41/12* (2013.01); *B65D 65/02* (2013.01); *C08K 5/07* (2013.01); *C08K 5/103* (2013.01); *C08L 27/06* (2013.01)

(58) Field of Classification Search
None
See application file for complete search history.

(56) References Cited

U.S. PATENT DOCUMENTS

| | | | | |
|---|---|---|---|---|
| 3,950,289 A | * | 4/1976 | D'Amato | C09D 131/04 |
| | | | | 526/330 |
| 5,149,724 A | * | 9/1992 | Fahey | C08K 5/103 |
| | | | | 524/910 |
| 2005/0020718 A1 | | 1/2005 | Gosse et al. | |
| 2013/0072611 A1 | | 3/2013 | Kwon et al. | |

FOREIGN PATENT DOCUMENTS

| | | | |
|---|---|---|---|
| JP | 5-117417 A | | 5/1993 |
| JP | 08092447 A | * | 4/1996 |
| JP | 9-194665 A | | 7/1997 |
| JP | 10158453 A | * | 6/1998 |
| JP | 11152163 A | * | 6/1999 |
| JP | 2000026683 A | * | 1/2000 |
| JP | 2006-176621 A | | 7/2006 |
| JP | 2015-34234 A | | 2/2015 |
| JP | 2015-218211 A | | 12/2015 |
| JP | 2016-169348 A | | 9/2016 |
| WO | WO 2011/021400 A1 | | 2/2011 |

OTHER PUBLICATIONS

JP-2000026683-A, Jan. 2000, Machine translation (Year: 2000).*
JP-11152163-A, Jun. 1999, Machine translation (Year: 1999).*
JP-08092447-A, Apr. 1996, Machine translation (Year: 1996).*
JP-10158453-A, machine translation, 1998 (Year: 1998).*
International Search Report issued Sep. 3, 2019 in PCT/JP2019/023570 filed Jun. 13, 2019 (with English translation) 5 pages.

* cited by examiner

*Primary Examiner* — Satya B Sastri
(74) *Attorney, Agent, or Firm* — Oblon, McClelland, Maier & Neustadt, L.L.P.

(57) ABSTRACT

A film for food packaging includes a resin composition comprising a vinyl chloride-based resin (A); a plasticizer (B); and an anti-fogging agent (C), wherein the composition comprises 1.5 parts by mass to 4.0 parts by mass of a diglycerin ester, 0.1 part by mass to 1.5 parts by mass of a glycerin monoester, and 0.1 part by mass to 3.0 parts by mass of an ethylene oxide adduct as the anti-fogging agent (C) relative to 100 parts by mass of the vinyl chloride-based resin (A).

9 Claims, No Drawings

FILM FOR FOOD PACKAGING, STRETCH FILM FOR FOOD PACKAGING, FILM FOR AUTOMATIC PACKAGING MACHINE FOR FOOD PACKAGING, AND METHOD FOR PACKAGING FOOD

CROSS-REFERENCE TO RELATED APPLICATION(S)

This application is a continuation of PCT international application Ser. No. PCT/JP2019/023570 filed on Jun. 13, 2019 which designates the United States, incorporated herein by reference, and which claims the benefit of priority from Japanese Patent Application No. 2018-114262, filed on Jun. 15, 2018, and Japanese Patent Application No. 2018-182222, filed on Sep. 27, 2018 incorporated herein by reference.

BACKGROUND

1. Technical Field

The present disclosure relates to a vinyl chloride-based film for food packaging, a stretch film for food packaging, and a film for an automatic packaging machine for food packaging, and a method for packaging food exhibiting excellent packaging suitability and anti-fogging property.

2. Description of the Related Art

For food packaging, in particular packaging for packaging fresh foods, such as meat, fish, and vegetables, a stretch film has been widely used as a film for food packaging having excellent transparency and flexibility. As a such film, a film formed of a vinyl chloride-based resin composition in which an adipic acid ester plasticizer, various anti-fogging agents, and the like are added to a vinyl chloride-based resin has been generally used.

In recent years, accompanying with spread of blister package packaging, the stretch film has been widely used for food packaging applications. Of these food packaging applications, packaging using an automatic packaging machine has been rapidly increased in order to improve a packaging speed. For the packaging using the automatic packaging machine, not only properties as the film for packaging (for example, transparency, an anti-fogging property, and flexibility) but also the packaging suitability to the automatic packaging machine have been required. In other words, it is required that the film can be smoothly unwound from a film roll and has excellent slipperiness to a tray.

In order to smoothly unwind the film from the film roll and provide excellent slipperiness to the tray, adjustment of the bleed out amount of the anti-fogging agent in an optimum range is important. For example, JP-H9-194665 A has disclosed a polyvinyl chloride-based stretch film formed by adding a monoglycerin fatty acid ester, a sorbitan fatty acid ester, and a polyoxyethylene alkyl ether as the anti-fogging agent. JP 2015-218211 A has disclosed a polyvinyl chloride-based resin composition including a glycerin-based anti-fogging agent. JP 2006-176621 A has disclosed a polyvinyl chloride-based stretch film in which an anti-fogging agent including a diglycerin fatty acid ester and stearic acid monoglyceride is added as the anti-fogging agent.

As described above, in the techniques described in JP-H9-194665 A, JP 2015-218211 A, and JP 2006-176621 A, the bleed out amounts of the anti-fogging agents are excessive and the slipperiness of the film is excessively high, resulting in poor packaging suitability for the automatic packaging machine. Therefore, it is hard to say that the techniques described in JP-H9-194665 A, JP 2015-218211 A, and JP 2006-176621 A are practically sufficient techniques.

SUMMARY

It is an object of the present disclosure to at least partially solve the problems in the conventional technology.

The present disclosure proposes a film for food packaging, the film comprising a resin composition comprising: a vinyl chloride-based resin (A); a plasticizer (B); and an anti-fogging agent (C), wherein 1.5 parts by mass to 4.0 parts by mass of a diglycerin ester, 0.1 part by mass to 1.5 parts by mass of a glycerin monoester, and 0.1 part by mass to 3.0 parts by mass of an ethylene oxide adduct are included as the anti-fogging agent (C) relative to 100 parts by mass of the vinyl chloride-based resin (A).

Further, the present disclosure proposes a method for packaging food using a film for food packaging comprising: a vinyl chloride-based resin (A); a plasticizer (B); and an anti-fogging agent (C), wherein 1.5 parts by mass to 4.0 parts by mass of a diglycerin ester, 0.1 part by mass to 1.5 parts by mass of a glycerin monoester, and 0.1 part by mass to 3.0 parts by mass of an ethylene oxide adduct are included as the anti-fogging agent (C) relative to 100 parts by mass of the vinyl chloride-based resin (A), the method comprising: forming the film for food packaging in a form of a roll having a width of 200 mm to 800 mm; loading the roll into an automatic packaging machine and unwinding the film in the form of the roll at a speed of 300 mm/second to 2,000 mm/second from the automatic packaging machine; and packaging food or a container containing food by wrapping the unwound film for food packaging around the food or the container containing food.

DETAILED DESCRIPTION OF THE PREFERRED EMBODIMENTS

Hereinafter, the film for food packaging will be described as one example of the embodiments of the present disclosure. However, the scope of the present disclosure is not limited to the embodiments described below. Here, the film for food packaging according to the present disclosure can be used as the stretch film for food packaging used for, for example, tray packaging of food. The film for food packaging according to the present disclosure can also be used as the film for the automatic packaging machine for food packaging used by loading the film into the automatic packaging machine for food packaging that packages trays containing food and the like. In addition, the method for packaging food according to the present disclosure can form the film for food packaging according to the present disclosure in the form of a roll, load the roll into the automatic packaging machine for food packaging that packages the trays for food, and wrap the film around food or a container containing food.

In the present disclosure, the expression "X to Y" (X and Y are numerical values) includes the meaning of "X or more and Y or less" as well as "preferably more than X" and "preferably less than Y", unless otherwise noted. In addition, in the present disclosure, the expression "X or more" (X is a numerical value) includes the meaning of "preferably more than X" and the expression "Y or less" (Y is a numerical value) includes the meaning of "preferably less than Y", unless otherwise noted.

The film for food packaging according to the present disclosure is a film for food packaging including a resin composition including a vinyl chloride-based resin (A), a plasticizer (B), and an anti-fogging agent (C), in which the resin composition is required to include 1.5 parts by mass to 4.0 parts by mass of a diglycerin ester, 0.1 part by mass to 1.5 parts by mass of a glycerin monoester, and 0.1 part by mass to 3.0 parts by mass of an ethylene oxide adduct as the anti-fogging agent (C) relative to 100 part by mass of the vinyl chloride-based resin (A).

The resin composition preferably further includes 0.01 part by mass to 1.0 part by mass of a β-diketone compound (D) relative to 100 parts by mass of the vinyl chloride-based resin (A).

The plasticizer (B) is preferably included in a range of 40 parts by mass to 60 parts by mass relative to 100 parts by mass of the vinyl chloride-based resin (A). The plasticizer (B) of the resin composition preferably includes at least one of an aliphatic dibasic acid ester compound and an epoxidized vegetable oil.

The resin composition preferably includes a Ca—Zn-based stabilizer as a heat stabilizer (E).

An unrolling force is preferably 80 gf or more and 150 gf or less per film width of 350 mm.

The stretch film for food packaging according to the present disclosure is provided by using any one of the films for food packaging described above.

The film for the automatic packaging machine for food packaging according to the present disclosure is provided by using any one of the films for food packaging described above.

The film for the automatic packaging machine for food packaging according to the present disclosure is provided by using any one of the stretch films for food packaging described above.

<Vinyl Chloride-Based Resin (A)>

As the vinyl chloride-based resin (A) used in the present disclosure, a vinyl chloride-based resin having an arbitrary average degree of polymerization may be used. The average degree of polymerization of the vinyl chloride-based resin (A) is preferably 1,000 to 1,500. When the average degree of polymerization of vinyl chloride resin (A) is 1,000 or more, the sufficient mechanical strength can be obtained. On the other hand, the vinyl chloride-based resin (A) having an average degree of polymerization of 1,500 or less causes generation of coloring due to decomposition to be prevented without generating heat associated with an increase in a melt viscosity.

Consequently, from such a viewpoint, the average degree of polymerization of the vinyl chloride-based resin (A) is more preferably 1,100 or more or 1,450 or less in the above range and, 1,200 or more or 1,350 or less is further preferable in this range.

The vinyl chloride-based resin (A) may include a homopolymer of vinyl chloride (referred to as a "vinyl chloride-based homopolymer"), a copolymer of vinyl chloride and a monomer copolymerizable with vinyl chloride (hereinafter, referred to as a "vinyl chloride-based copolymer"), and a graft copolymer in which vinyl chloride is graft-copolymerized with a polymer other than the vinyl chloride-based copolymer (hereinafter, referred to as a "vinyl chloride-based graft copolymer").

The vinyl chloride-based homopolymer and the vinyl chloride-based copolymer may be polymerized by, for example, an emulsion polymerization method, a suspension polymerization method, a solution polymerization method, and a bulk polymerization method.

The mechanical properties of the vinyl chloride-based copolymer become low when the content of the constitutional unit other than vinyl chloride in the copolymer is increased. Therefore, the proportion of vinyl chloride in the vinyl chloride-based copolymer is preferably 60% by mass to 99% by mass.

The monomer copolymerizable with vinyl chloride may be monomers having a reactive double bond. Example of the monomer include α-olefins such as ethylene, propylene, and butylene; vinyl esters such as vinyl acetate and vinyl propionate; vinyl ethers such as butyl vinyl ether and cetyl vinyl ether; unsaturated carboxylic acids such as acrylic acid and methacrylic acid; esters of acrylic acid or methacrylic acid such as methyl acrylate, ethyl methacrylate, and phenyl methacrylate; aromatic vinyl compounds such as styrene and α-methylstyrene; halogenated vinyl compounds such as vinylidene chloride and vinyl fluoride, and N-substituted maleimides such as N-phenylmaleimide and N-cyclohexylmaleimide. These monomers may be used alone or in combination of two or more monomers.

The polymer other than the vinyl chloride-based copolymer may be a copolymer that can be graft-copolymerized with vinyl chloride. Examples of the copolymer may include an ethylene/vinyl acetate copolymer, an ethylene/vinyl acetate/carbon monoxide copolymer, an ethylene/ethyl acrylate copolymer, an ethylene/ethyl acrylate/carbon monoxide copolymer, an ethylene/methyl methacrylate copolymer, an ethylene/propylene copolymer, an acrylonitrile/butadiene copolymer, polyurethane, chlorinated polyethylene, and chlorinated polypropylene. These copolymers may be used alone or in combination of two or more polymers.

<Plasticizer (B)>

The plasticizer used in the present disclosure is not particularly limited as long as the plasticizer has an excellent compatibility with the vinyl chloride-based resin (A) and well-known plasticizers may be used. Examples of such a plasticizer include aliphatic dibasic acid ester compounds such as dimethyl adipate (DMA), dibutyl adipate (DBA), diisobutyl adipate (DIBA), di-2-ethylhexyl adipate (DOA), diisononyl adipate (DINA), diisodecyl adipate (DIDA), di-2-ethylhexyl azelate (DOZ), dimethyl sebacate (DMS), dibutyl sebacate (DBS), and di-2-ethylhexyl sebacate (DOS) and epoxidized vegetable oils such as epoxidized soybean oil, epoxidized linseed oil, epoxidized cottonseed oil, epoxidized peanut oil, epoxidized safflower oil, epoxidized grape seed oil, and epoxidized olive oil. These plasticizers may be used alone or in combination of two or more of the plasticizers. As the plasticizer used in the present disclosure, an aliphatic dibasic acid ester compound or an epoxidized vegetable oil is preferably used from the viewpoint of plasticization efficiency and thermal stability and the aliphatic dibasic acid ester compound and the epoxidized vegetable oil are further preferably used. Each of these plasticizers may be used alone or in combination of two or more of the plasticizers. In addition, the aliphatic dibasic acid ester compound and the epoxidized vegetable oil are particularly preferably used together from the viewpoint of the color tone of the film.

<Anti-Fogging Agent (C)>

The anti-fogging agent (C) used in the present disclosure is required to use the glycerin monoester, the diglycerin ester, and the ethylene oxide adduct together. By adding the mixture of these compounds as the anti-fogging agent, both of the packaging suitability in the automatic packaging machine and the anti-fogging property can be satisfied.

The diglycerin ester may be any of a monoester, a diester, a triester, and a tetraester and is preferably the monoester.

The diglycerin ester is preferably a compound made of a saturated fatty acid or an unsaturated fatty acid having a carbon number of 8 to 18. Specific examples of the diglycerin ester include diglyceryl myristate, diglyceryl palmitate, diglyceryl stearate, diglyceryl linoleate, diglyceryl oleate, diglyceryl laurate, and diglyceryl caprylate. Examples of commercially available diglycerin esters include RIKEMAL L-71-D (diglyceryl laurate), RIKEMAL S-71-D (diglyceryl stearate), and RIKEMAL O-71-D (diglyceryl oleate) manufactured by Riken Vitamin Co., Ltd. and MCA-150 (diglyceryl caprylate) manufactured by Sakamoto Yakuhin Kogyo Co., Ltd. Two or more of these diglycerin esters may be used in combination.

Specific examples of the glycerin monoester include glyceryl monooleate, glyceryl monolaurate, glyceryl monomyristate, glyceryl monopalmitate, glyceryl monobehenate, glyceryl monostearate, glyceryl monolinoleate, and glyceryl monocaprate. Examples of commercially available products of glycerin monoester include RIKEMAL S-100 (glyceryl monostearate), RIKEMAL B-100 (glyceryl monobehenate), RIKEMAL OL-100 (glyceryl monooleate), Poem M-200 (glyceryl monocaprate), and Poem M-300 (glyceryl monolaurate) manufactured by Riken Vitamin Co., Ltd.

Specific examples of the ethylene oxide adduct include a polyoxyethylene alkyl ether, a polyoxyethylene sorbitan fatty acid ester, and a polyoxyethylene fatty acid ester. Examples of commercially available products of the ethylene oxide adduct include RIKEMAL O-852 (polyoxyethylene sorbitan trioleate) and RIKEMAL B-205 (polyoxyethylene alkyl ether) manufactured by Riken Vitamin Co., Ltd. and Rheodor TW series (polyoxyethylene sorbitan fatty acid esters) and Emanon series (polyoxyethylene fatty acid esters) manufactured by Kao Corporation.

As the anti-fogging agent (C), an anti-fogging agent other than the glycerin monoester, diglycerin ester, and ethylene oxide adduct (hereinafter referred to as "other anti-fogging agents") may be used in combination. Examples of the other anti-fogging agents include sorbitan esters, propylene glycol esters, and sucrose esters. The content proportion of the other anti-fogging agents is preferably 20 parts by mass or less and more preferably 10 parts by mass or less in the case where the total amount of the anti-fogging agent (C) is determined to be 100 parts by mass.

<β-Diketone Compound (D)>

The resin composition constituting the film for food packaging according to the present disclosure may further include a β-diketone compound as a component. Further including the β-diketone compound allows the color tone of the film for food packaging to be more excellent. Examples of the β-diketone compound used in the present disclosure include dehydroacetic acid, acetyltetralone, benzoyltetralone, 2-benzoylcyclohexanone, dibenzoylmethane, benzoyl-4-chlorobenzoylmethane, bis(4-methylbenzoyl)methane, 4-tert-butylbenzoyl-4-methoxybenzoylmethane, benzoyl-4-isopropylbenzoylmethane, bis(4-methoxybenzoyl)methane, acetylbenzoylmethane, acetylbenzoylallylmethane, propionyl-3-methoxycarbonylbenzoylmethane, isovaleroylbenzoylmethane, octanoylbenzoylmethane, palmitoylbenzoylmethane, stearoylbenzoylmethane, dipivaloylmethane, and distearoylmethane. These β-diketone compounds may be used alone or in combination of two or more of the compounds.

<Blending Proportion of Each Component>

As the blending proportion of each component used in the present disclosure, the plasticizer (B) is preferably added in a range of 35 parts by mass to 60 parts by mass and more preferably added in a range of 40 parts by mass to 60 parts by mass relative to 100 parts by mass of the vinyl chloride-based resin (A). The lower limit is more preferably 42 parts by mass or more and further preferably 45 parts by mass or more. On the other hand, the upper limit is more preferably 58 parts by mass or less and further preferably 55 parts by mass or less. By adding the plasticizer (B) in such a range, the film for packaging having moderate flexibility can be provided.

In addition, as the anti-fogging agent (C), addition of the diglycerin ester in a range of 1.5 parts by mass to 4.0 parts by mass is important. The lower limit is more preferably 1.7 parts by mass or more and further preferably 2.0 parts by mass or more. On the other hand, the upper limit is more preferably 3.8 parts by mass or less and further preferably 3.5 parts by mass or less. In addition, as the anti-fogging agent (C), addition of the glycerin monoester in a range of 0.1 part by mass to 1.5 parts by mass is important. The lower limit is more preferably 0.12 part by mass or more and further preferably 0.13 part by mass or more. On the other hand, the upper limit is more preferably 1.4 parts by mass or less and further preferably 1.3 parts by mass or less. In addition, as the anti-fogging agent (C), addition of the ethylene oxide adduct in a range of 0.1 part by mass to 3.0 parts by mass is important. The lower limit is more preferably 0.11 part by mass or more and further preferably 0.12 part by mass or more. On the other hand, the upper limit is more preferably 2.8 parts by mass or less and further preferably 2.6 parts by mass or less. By adding the anti-fogging agent (C) within such a range, both of the packaging suitability in the automatic packaging machine and the anti-fogging property can be satisfied and the color tone can be in an excellent range.

<Heat Stabilizer (E)>

In order to improve the heat stability during the production process, the film according to the present disclosure preferably includes a heat stabilizer, and preferably a Ca—Zn-based stabilizer from the viewpoint of not containing harmful heavy metals. The Ca—Zn-based stabilizer refers to a mixture of a calcium fatty acid salt and a zinc fatty acid salt. Specific examples of the fatty acid include behenic acid, stearic acid, lauric acid, oleic acid, palmitic acid, ricinoleic acid, and benzoic acid. Two or more such fatty acids may be used in combination depending on the purpose. The ratio of calcium to zinc is preferably 1:2 to 1:3 based on the mass. The Ca—Zn-based stabilizer having a ratio of zinc to calcium of less than 2 tends to cause redness peculiar to the calcium salt, whereas the Ca—Zn-based stabilizer having a ratio of zinc to calcium of more than 3 may cause rapid blackening and decomposition called "zinc burn" because zinc chloride generated during the molding process acts as a decomposition catalyst for the vinyl chloride-based resin.

The amount of the Ca—Zn-based stabilizer to be added is preferably 0.1 part by mass or more and 2.0 parts by mass or less and preferably 0.2 part by mass or more and 1.8 parts by mass or less relative to 100 parts by mass of the vinyl chloride-based resin (A). An amount to be added of less than 0.1 part by mass may provide insufficient effect of the heat stability, whereas an amount to be added of more than 2.0 parts by mass may similarly cause the "zinc burn".

<Other Components>

Furthermore, additives such as antioxidants, ultraviolet absorbers, light stabilizers, antibacterial/antifungal agents, antistatic agents, lubricants, pigments, and dyes may be added to the resin composition within a range not impairing the effects of the present disclosure.

<Unrolling Force (Automatic Packaging Machine Suitability)>

The automatic packaging machine suitability of the film according to the present disclosure, that is, the determination whether the film wound in the form of a roll is loaded into the automatic packaging machine and the film can be automatically rolled out and stretched in horizontal and vertical directions to continuously package food trays and the like can be evaluated by the unrolling force of the film. The unrolling force is preferably 80 gf or more and 150 gf or less per width of 350 mm. The lower limit of the unrolling force is more preferably 90 gf or more and further preferably 100 gf or more. On the other hand, the upper limit of the unwinding force is more preferably 140 gf or less and further preferably 130 gf or less. The unrolling force is related to the roll-out property of the film and the stretch property of the film in the automatic packaging machine. By setting the lower limit of the unrolling force to 80 gf or more, the film can be uniformly stretched for packaging while maintaining the tension of the film when the film is rolled out in the automatic packaging machine. On the other hand, by setting the upper limit of the unrolling force to 150 gf or less, the film can be rolled out smoothly in the automatic packaging machine, which provides excellent productivity. In other words, by setting the unrolling force within the above range, the film can be suitably used as the film for the automatic packaging machine for food packaging.

Here, the unrolling force means a load (gf) required when the film is unwound from the roll. An excessively large unrolling force causes the film not to be unwound. On the other hand, an excessively small unrolling force causes the film to be easily detached from the film carrier in the automatic packaging machine.

<Method for Producing>

As the method for producing the film according to the present disclosure, well-known methods may be used. The film can be produced by, for example, a method of mixing the vinyl chloride-based resin (A), the plasticizer (B), the anti-fogging agent (C), and other additives by a mixer such as a V-type blender, a ribbon blender, or a Henschel mixer, a method of kneading them by a kneading machine such as an extruder, mixing rolls, a Banbury mixer, or a kneader, or after mixing and kneading them with the combination of the mixer and the kneading machine, using a T-die method or an inflation method or the like.

The thickness of the film according to the present disclosure is preferably 5 μm or more and 20 μm or less and more preferably 10 μm or more and 15 μm or less. A film having a thickness of less than 5 μm may be broken due to insufficient strength of the film when food such as a cucumber or a crab that has a shape having protrusion parts is packaged, whereas a film having a thickness of more than 20 μm exhibits difficulty in stretch of the film and thus the packaging suitability worsens.

The film for food packaging according to the present disclosure is preferably used in the form of a roll (a wound body).

In the case where the film for food packaging according to the present disclosure is in the form of a roll, the width of the roll is not limited as long as the width of the roll may usually be longer than the perimeter of the packaging object. The width is usually 200 mm to 800 mm, preferably 220 mm to 700 mm, particularly preferably 230 mm to 600 mm, and most preferably 250 mm to 500 mm. The roll having such a width has excellent suitability as the film for food packaging, particularly has excellent suitability as the film for the automatic packaging machine, and is preferable from the viewpoint of ease of handling.

In the case where the film for food packaging according to the present disclosure is in the form of a roll, the diameter (outer diameter) of the roll is not limited, usually 400 mm or less, preferably 300 mm or less, and more preferably 200 mm or less. The roll of the film having such a diameter can be satisfactorily used from the initial unrolling, in particular as the film for the automatic packaging machine.

In the case where the film for food packaging according to the present disclosure is in the form of a roll, the winding core diameter of the roll is not limited. For example, the winding core having a diameter of 50 mm to 150 mm can be preferably used.

In the case where packaging is performed with the film for food packaging according to the present disclosure as the film for the automatic packaging machine using the automatic packaging machine, the following method is preferably used.

1) The film for food packaging according to the present disclosure is formed into the form of a roll.
2) The roll is loaded into the automatic packaging machine.
3) The film in the form of a roll is unwound from the automatic packaging machine.
4) The unwound film is wrapped around food or a container containing food.

In the above process, the speed of unwinding the film in the form of a roll from the automatic packaging machine is preferably 300 mm/second to 2,000 mm/second, more preferably 400 mm/second to 1,700 mm/second, further preferably 500 mm/second to 1,500 mm/second, particularly preferably 600 mm/second to 1,200 mm/second, and most preferably 800 mm/second to 1,000 mm/second.

The unrolling force value of the film according to the present disclosure can be adjusted to the above-described value by using the specific anti-fogging agent in the specific proportion and thus the film can be suitably used for the automatic packaging machine for food packaging. The unrolling force can be set to an optimum range by unwinding in the above speed range.

The unrolling force when the film according to the present disclosure is unwound from the automatic packaging machine for food packaging is preferably 80 gf or more and 150 gf or less as a value per film width of 350 mm. The lower limit of the unrolling force is more preferably 90 gf or more and further preferably 100 gf or more. On the other hand, the upper limit of the unwinding force is more preferably 140 gf or less and further preferably 130 gf or less.

EXAMPLES

Examples will be described below. The present disclosure is not limited by these Examples at all. The various measured values and evaluation with respect to the raw materials and the test specimens that are described in the present specification were performed as follows.

<Evaluation Methods>

(1) Film Unwinding Force (Hand Packaging Suitability)

Ten meters of the film having a width 50 mm prepared in Examples or Comparative Examples was wound on a cylindrical paper tube having an outer diameter of 85 mm and a length of 330 mm, and thereafter a pipe made of a vinyl chloride resin having an outer diameter of 25 mm was inserted into the paper tube so that the film roll rotates smoothly. Subsequently, a load applied when the film was unwound at a speed of 3 cm/sec was measured using a force gauge while the film tip was held with a clip so that the film could be unwound uniformly. If the unwinding force at this time was 0.1 N/50 mm to 0.5 N/50 mm, it could be said that the hand packaging suitability was excellent (evaluation was "○"). By evaluating the unwinding force of the film according to the present disclosure, the packaging suitability by hand packaging can be evaluated. Here, the hand packaging suitability refers to the suitability for pulling the single-roll film using a hand and directly wrapping it or the suitability at the time of setting the film in the automatic packaging machine.

(2) Anti-Fogging Property

After placing 8 shishamo (shishamo smelt) on a polystyrene foam tray "Shishamo 8F" (trade name; manufactured by Chuo Kagaku Co., Ltd.) and packaging 10 packs with an automatic packaging machine A-18X (trade name; manufactured by (FUJI MACHINERY CO., LTD.), those packs were stored in a freezer at −25° C. to −30° C. for one week and thereafter put into a showcase at −2° C. to 5° C. to evaluate a low-temperature anti-fogging property when 1 hour had passed.

The case where a water film was uniform and the packaged contents was clearly visible without any moisture contained in the packaged contents condensed on the film surface, that is, the case where the low-temperature anti-fogging property was excellent was evaluated as ○ and the case where the moisture contained in the packaged contents was condensed on the film surface or the water film was not uniform and the part of this water film turned to the form of a lens was evaluated as x.

(3) Color Tone

The film according to the present disclosure was overlaid to be 3 mm in thickness to prepare a measurement sample. A b value of this sample was measured by a transmission method in accordance with the method of JIS Z8722 using TC-1800MKII manufactured by Tokyo Denshoku Co., Ltd. If the b-value is less than 40 or less, the color tone of the film can be evaluated to be in a good range. The b value is more preferably 30 or less and the b value is particularly preferably 25 or less.

In addition, in the case where the color tone was not measured using the above color tone (the b value) as the evaluation criteria, the color tone of the sample for measurement was evaluated by visual observation. Determination of the color tone by the visual observation is performed by comparing with an evaluation sample having a known b value. In this evaluation, the case where the color tone (b value) corresponding to an evaluation sample having a color tone of 25 or less was determined to be ○, the case where the color tone (the b value) corresponding to an evaluation sample having a color tone in the range of 25 to 40 was determined to be Δ, and the color tone (b value) corresponded to an evaluation sample having a color tone of more than 40 was determined to be x. As with the evaluation method by measuring the b value, evaluation as ○ or Δ allows the color of the film to be evaluated as an excellent range, and the evaluation as ○ is particularly preferable.

(4) Unrolling Force (Automatic Packaging Machine Suitability)

The unrolling force of the film was measured by the following method. First, a core rod was passed horizontally through a roll winding tube so that the roll could freely rotate. The film end of the film to be measured was pulled up vertically above the roll and set so as to be fixed and supported evenly over the entire width of the film. Thereafter, the roll was dropped vertically downward to measure the unrolling force of a film to be measured from the roll. In this test, a film roll having a width of 350 mm was set to measure a change in strength and weakness of the unrolling force during the drop of the roll in a distance of 500 mm at a speed of 500 mm/min using a Strograph type or Autograph type tensile tester. The values at the time when the unrolling force changed from increase to decrease, that is, the averaged values of each apex (local maximum values) on the measurement graph were defined as the unrolling force. Here, the unrolling force is a value per film width of 350 mm. In the case where the film width is different, for example, in the case where the film width is 400 mm, the unrolling force per film width of 350 mm can be calculated and evaluated by multiplying (350/400) to the measured unrolling force. In the present specification, a film having an unrolling force of 80 gf to 150 gf is indicated as "○", which has excellent automatic packaging machine suitability, whereas a film having an unrolling force of less than 80 gf or more than 150 gf is indicated as "x", which has inappropriate automatic packaging machine suitability. In addition, the unrolling force of the film according to the present disclosure is more preferably 90 gf to 140 gf and further preferably 100 gf to 130 gf.

<Materials to be Used>

[Vinyl Chloride-Based Resin (A)]

(A)-1: TK-1300S manufactured by Shin-Etsu Chemical Co., Ltd. (vinyl chloride homopolymer, average degree of polymerization 1300)

[Plasticizer (B)]

(B)-1: Sansocizer DINA (diisononyl adipate) manufactured by New Japan Chemical Co., Ltd.

(B)-2: Kapox S-6 (epoxidized soybean oil) manufactured by Kao Corporation

[Anti-Fogging Agent (C)]

(C)-1: RIKEMAL O-71D (diglycerin ester: diglyceryl oleate) manufactured by Riken Vitamin Co., Ltd.

(C)-2: RIKEMAL L-71D (diglycerin ester: diglyceryl laurate) manufactured by Riken Vitamin Co., Ltd.

(C)-3: RIKEMAL OL-100 (glycerin monoester: glyceryl monooleate) manufactured by Riken Vitamin Co., Ltd.

(C)-4: RIKEMAL OE-809 (ethylene oxide adduct: polyethylene glycol monooleate) manufactured by Riken Vitamin Co., Ltd.

[β-Diketone Compound (D)]

(D)-1: Stearoylbenzoylmethane manufactured by Sigma Chemical Corporation

[Stabilizer (E)]

(E)-1: Adekastab SP-76 (Ca—Zn-based stabilizer) manufactured by ADEKA Corporation Example 1

35 parts by mass of (B)-1, 10 parts by mass of (B)-2, 1.0 part by mass of (C)-1, 2.0 parts by mass of (C)-2, 0.4 part by mass of (C)-3, 0.3 part by mass of (C)-4, and 0.3 part by mass of (E)-1 relative to 100 parts by mass of (A)-1 were charged into a super mixer. Thereafter, the temperature was raised from room temperature to 130° C. with stirring to heat and mix the mixture. Thereafter, the resultant mixture was taken out at the time of cooling to 70° C. to give a resin composition.

The obtained resin composition was molded by extrusion at a resin temperature of 200° C. using a single screw extruder having a screw diameter of 40 mm (L/D=20) equipped with a T die (a width of 350 mm and a gap of 0.4 mm) to give a film having a thickness of 0.01 mm.

The packaging suitability, the anti-fogging property, the color tone, and the unrolling force of the obtained film were evaluated.

Example 2

A film was prepared and evaluated in the same manner as the manner in Example 1 except that the proportion of (C)-4 was set to 1.5 parts by mass in Example 1.

Example 3

A film was prepared and evaluated in the same manner as the manner in Example 1 except that 0.01 part by mass of (D)-1 was further added in Example 2.

Example 4

A film was prepared and evaluated in the same manner as the manner in Example 1 except that the proportion of (D)-1 was set to 0.03 part by mass in Example 3.

Example 5

A film was prepared and evaluated in the same manner as the manner in Example 1 except that (B)-2 was not added in Example 1.

Example 6

A film was prepared and evaluated in the same manner as the manner in Example 1 except that the proportion of (C)-1 was set to 0.8 part by mass, the proportion of (C)-3 was set to 0.14 part by mass, and the proportion of (C)-4 was set to 1.5 parts by mass in Example 1.

Example 7

A film was prepared and evaluated in the same manner as the manner in Example 6 except that the proportion of (C)-2 was set to 1.6 parts by mass and the proportion of (C)-3 was set to 0.18 part by mass in Example 6.

Example 8

A film was prepared and evaluated in the same manner as the manner in Example 6 except that the proportion of (C)-4 was set to 0.9 part by mass in Example 6.

Example 9

A film was prepared and evaluated in the same manner as the manner in Example 6 except that the proportion of (C)-4 was set to 0.3 part by mass in Example 6.

Example 10

A film was prepared and evaluated in the same manner as the manner in Example 6 except that the proportion of (C)-3 was set to 1.2 parts by mass in Example 6.

Example 11

A film was prepared and evaluated in the same manner as the manner in Example 6 except that the proportion of (C)-4 was set to 2.5 parts by mass in Example 6.

Comparative Example 1

A film was prepared and evaluated in the same manner as the manner in Example 1 except that (C)-4 was not added in Example 1.

Comparative Example 2

A film was prepared and evaluated in the same manner as the manner in Example 1 except that (C)-3 was not added in Example 1.

Comparative Example 3

A film was prepared and evaluated in the same manner as the manner in Example 1 except that (C)-1 and (C)-2 were not added and the proportion of (C)-3 was set to 3.0 parts by mass in Example 1.

Comparative Example 4

A film was prepared and evaluated in the same manner as the manner in Example 1 except that the proportion of (C)-4 was set to 4.0 parts by mass in Example 1.

Comparative Example 5

A film was prepared and evaluated in the same manner as the manner in Example 1 except that the proportion of (C)-1 was set to 2.3 parts by mass, the proportion of (C)-2 was set to 2.5 parts by mass, and (C)-3 and (C)-4 were not added in Example 1.

Comparative Example 6

A film was prepared and evaluated in the same manner as the manner in Example 1 except that the proportion of (C)-1 was set to 2.3 parts by mass, the proportion of (C)-2 was set to 1.0 part by mass, and (C)-3 and (C)-4 were not added in Example 1.

Comparative Example 7

A film was prepared and evaluated in the same manner as the manner in Example 1 except that the proportion of (C)-1 was set to 0.8 part by mass and (C)-4 was not added in Example 1.

Comparative Example 8

A film was prepared and evaluated in the same manner as the manner in Example 1 except that the proportion of (C)-1 was set to 0.8 part by mass, the proportion of (C)-3 was set to 2.0 parts by mass, and the proportion of (C)-4 was set to 1.5 parts by mass in Example 1.

Comparative Example 9

A film was prepared and evaluated in the same manner as the manner in Example 1 except that the proportion of (C)-2 was set to 1.0 part by mass and (C)-3 and (C)-4 were not added in Example 1.

Comparative Example 10

A film was prepared and evaluated in the same manner as the manner in Example 1 except that the proportion of (C)-1 was set to 0.8 part by mass, the proportion of (C)-3 was set to 0.14 part by mass, and the proportion of (C)-4 was set to 3.5 parts by mass in Example 1.

The above results are listed in Table 1 to Table 3.

TABLE 1

|  | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|
| (A)-1 | 100 | 100 | 100 | 100 | 100 | 100 | 100 | 100 | 100 |
| (B)-1 | 35 | 35 | 35 | 35 | 35 | 35 | 35 | 35 | 35 |
| (B)-2 | 10 | 10 | 10 | 10 | — | 10 | 10 | 10 | 10 |
| (C)-1 | 1.0 | 1.0 | 1.0 | 1.0 | 1.0 | 1.0 | 1.0 | — | 1.0 |
| (C)-2 | 2.0 | 2.0 | 2.0 | 2.0 | 2.0 | 2.0 | 2.0 | — | 2.0 |
| (C)-3 | 0.4 | 0.4 | 0.4 | 0.4 | 0.4 | 0.4 | — | 3.0 | 0.4 |
| (C)-4 | 0.3 | 1.5 | 1.5 | 1.5 | 0.3 | — | 0.3 | 0.3 | 4.0 |
| (D)-1 | — | — | 0.01 | 0.03 | — | — | — | — | — |
| (E)-1 | 0.3 | 0.3 | 0.3 | 0.3 | 0.3 | 0.3 | 0.3 | 0.3 | 0.3 |
| Film unwinding force (hand packaging suitability) | ○ | ○ | ○ | ○ | x | x | ○ | ○ | ○ |
| Anti-fogging property | ○ | ○ | ○ | ○ | ○ | ○ | x | x | x |
| Color tone (b value) | 21 | 20 | 12 | 7 | 40 | 10 | 20 | 20 | 32 |
| Unrolling force (gf) | 125 | 121 | 120 | 120 | 112 | 32 | 172 | 36 | 98 |
| Automatic packaging machine suitability | ○ | ○ | ○ | ○ | ○ | x | x | x | ○ |

TABLE 2

|  | Example 6 | Example 7 | Example 8 | Example 9 | Example 10 | Example 11 |
|---|---|---|---|---|---|---|
| (A)-1 | 100 | 100 | 100 | 100 | 100 | 100 |
| (B)-1 | 35 | 35 | 35 | 35 | 35 | 35 |
| (B)-2 | 10 | 10 | 10 | 10 | 10 | 10 |
| (C)-1 | 0.8 | 0.8 | 0.8 | 0.8 | 0.8 | 0.8 |
| (C)-2 | 2.0 | 1.6 | 2.0 | 2.0 | 2.0 | 2.0 |
| (C)-3 | 0.14 | 0.18 | 0.14 | 0.14 | 1.2 | 0.14 |
| (C)-4 | 1.5 | 1.5 | 0.9 | 0.3 | 1.5 | 2.5 |
| (D)-1 | — | — | — | — | — | — |
| (E)-1 | 0.3 | 0.3 | 0.3 | 0.3 | 0.3 | 0.3 |
| Film unwinding force (hand packaging suitability) | ○ | ○ | ○ | ○ | ○ | ○ |
| Anti-fogging property | ○ | ○ | ○ | ○ | ○ | ○ |
| Color tone (b value) | 7 | 28 | 19 | 7 | — | — |
| Color tone (visual observation) | — | — | — | — | Λ | Λ |
| Unrolling force (gf) | 90 | 94 | 111 | 127 | 95 | 125 |
| Automatic packaging machine suitability | ○ | ○ | ○ | ○ | ○ | ○ |

TABLE 3

|  | Comparative Example 5 | Comparative Example 6 | Comparative Example 7 | Comparative Example 8 | Comparative Example 9 | Comparative Example 10 |
|---|---|---|---|---|---|---|
| (A)-1 | 100 | 100 | 100 | 100 | 100 | 100 |
| (B)-1 | 35 | 35 | 35 | 35 | 35 | 35 |
| (B)-2 | 10 | 10 | 10 | 10 | 10 | 10 |
| (C)-1 | 2.3 | 2.3 | 0.8 | 0.8 | 1.0 | 0.8 |
| (C)-2 | 2.5 | 1.0 | 2.0 | 2.0 | 1.0 | 2.0 |
| (C)-3 | — | — | 0.4 | 2.0 | — | 0.14 |
| (C)-4 | — | — | — | 1.5 | — | 3.5 |
| (D)-1 | — | — | — | — | — | — |
| (E)-1 | 0.3 | 0.3 | 0.3 | 0.3 | 0.3 | 0.3 |
| Film unwinding force (hand packaging suitability) | x | x | ○ | ○ | ○ | x |
| Anti-fogging property | ○ | ○ | x | ○ | x | ○ |
| Color tone (b value) | — | — | — | — | — | — |
| Color tone (visual observation) | ○ | ○ | Λ | x | ○ | ○ |
| Unrolling force (gf) | 40 | 51 | 93 | 95 | 145 | 165 |
| Automatic packaging machine suitability | x | x | ○ | ○ | ○ | x |

As listed in Table 1 and Table 2, the film unwinding force (hand packaging suitability), the anti-fogging property, the color tone (the b value or visual observation), the unrolling force (gf), and the automatic packaging machine suitability of the films of Example 1 to Example 11 can be controlled in suitable ranges by using the resin compositions including 35 parts by mass to 60 parts by mass of the plasticizer (B), 1.5 parts by mass to 4.0 parts by mass of the diglycerin ester, 0.1 part by mass to 1.5 parts by mass of the glycerin monoester, and 0.1 part by mass to 3.0 parts by mass of the ethylene oxide adduct as the anti-fogging agent (C) relative to 100 parts by mass of the vinyl chloride-based resin (A). In addition, as indicated in Example 3 and Example 4, the color tone can be controlled in a more suitable range by further adding the β-diketone compound (D) in an amount of 0.01 part by mass to 1.0 part by mass relative to 100 parts by mass of the vinyl chloride-based resin (A). In addition, as indicated in Example 5, even in the case where diisononyl adipate (B)-1 alone is used as the plasticizer (B), the anti-fogging property, the color tone (the b value), the unrolling force (gf), and the automatic packaging machine suitability can be controlled in a suitable range.

On the contrary, as indicated in Comparative Examples 1 to 3, all of the packaging suitability, the anti-fogging property, and the unrolling force are not satisfied in the case where any one of the diglycerin ester, the glycerin monoester, and the ethylene oxide adduct is not included. In addition, as indicated in Comparative Example 4, the anti-fogging property is not satisfied in the case where 4.0 parts by mass of the ethylene oxide adduct is used as the anti-fogging agent (C).

In addition, as listed in Table 3, in the case where the glycerin monoester and the ethylene oxide adduct are not added in Comparative Example 5 and Comparative Example 6, the films is excessively slipped and thus the film unwinding force (hand packaging suitability) are not satisfied. In addition, as indicated in Comparative Example 7, in the case where the ethylene oxide adduct is not added, the anti-fogging property is not satisfied. In addition, as indicated in Comparative Example 8, in the case where the glycerin monoester is excessively added, the color tone is not satisfied. In addition, as indicated in Comparative Example 9, in the case where the amount of the diglycerin ester to be added is decreased in order to adjust the slipperiness of Comparative Example 5 and Comparative Example 6, the anti-fogging property is not satisfied due to not adding the glycerin monoester and the ethylene oxide adduct. In addition, as indicated in Comparative Example 10, in the case where the ethylene oxide adduct is excessively added, the slipperiness is insufficient and thus the film unwinding force (the hand packaging suitability) and the automatic packaging machine suitability are not satisfied.

From the above results, the effects of the present disclosure are obvious.

The film for food packaging, the stretch film for food packaging, the film for the automatic packaging machine for food packaging, and the method for packaging food proposed in the present disclosure have both excellent packaging suitability for the automatic packaging machine and the anti-fogging property, and thus can be widely used for the food packaging applications.

What is claimed is:

1. A film for food packaging, the film comprising a resin composition comprising: a vinyl chloride-based resin (A); a plasticizer (B); and an anti-fogging agent (C), comprising relative to 100 parts by mass of the vinyl chloride-based resin (A):
    2.4 parts by mass to 4.0 parts by mass of a diglycerin ester,
    0.1 part by mass to 1.5 parts by mass of a glycerin monoester, and
    0.1 part by mass to 3.0 parts by mass of an ethylene oxide adduct.

2. The film for food packaging according to claim 1, wherein the resin composition further comprises 0.01 part by mass to 1.0 part by mass of a β-diketone compound (D) relative to 100 parts by mass of the vinyl chloride-based resin (A).

3. The film for food packaging according to claim 1, wherein the plasticizer (B) comprises at least one of an aliphatic dibasic acid ester compound or an epoxidized vegetable oil.

4. The film for food packaging according to claim 1, wherein the resin composition further comprises a Ca—Zn-based stabilizer as a heat stabilizer (E).

5. The film for food packaging according to claim 1, wherein an unrolling force per film width of 350 mm is 80 gf or more and 150 gf or less.

6. A stretch film for food packaging, comprising the film for food packaging according to claim 1.

7. A film for an automatic packaging machine for food packaging, comprising the film for food packaging according to claim 1.

8. A film for an automatic packaging machine for food packaging, comprising the stretch film for food packaging according to claim 6.

9. A method for packaging food using a film for food packaging comprising: a vinyl chloride-based resin (A); a plasticizer (B); and an anti-fogging agent (C), comprising relative to 100 parts by mass of the vinyl chloride-based resin (A):

2.4 parts by mass to 4.0 parts by mass of a diglycerin ester,
0.1 part by mass to 1.5 parts by mass of a glycerin monoester, and
0.1 part by mass to 3.0 parts by mass of an ethylene oxide adduct, the method comprising:

forming the film for food packaging in a form of a roll having a width of 200 mm to 800 mm;

loading the roll into an automatic packaging machine and unwinding the film in the form of the roll at a speed of 300 mm/second to 2,000 mm/second from the automatic packaging machine; and packaging food or a container containing food by wrapping the unwound film for food packaging around the food or the container containing food.

* * * * *